Figure 1:
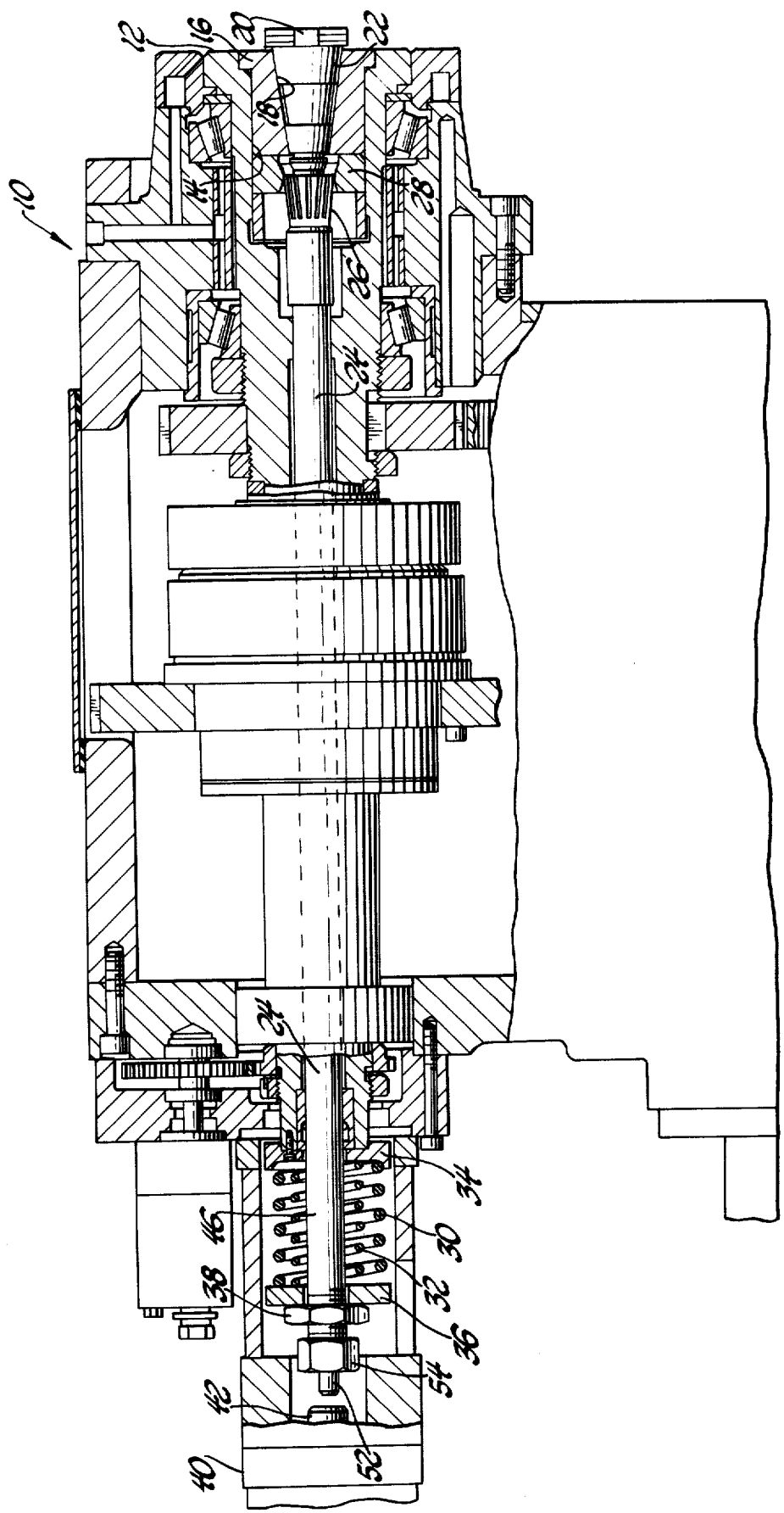

United States Patent [19]
Powell

[11] 3,875,848
[45] Apr. 8, 1975

[54] SPINDLE AND DRAW BAR ASSEMBLY
[75] Inventor: Thomas Alun Powell, Brighton, Mich.
[73] Assignee: Ex-Cell-O Corporation, Detroit, Mich.
[22] Filed: Aug. 10, 1973
[21] Appl. No.: 387,397

[52] U.S. Cl............. 90/11 D; 90/11 A; 408/239 A
[51] Int. Cl. ............................................. B23c 5/26
[58] Field of Search ...... 90/11 D, 11 A; 408/239 A; 29/26 A, 568

[56] References Cited
UNITED STATES PATENTS
3,466,739  9/1969  Harman ............................... 29/568
3,762,271  10/1973  Poincenot ........................... 90/11 D Primary Examiner—Andrew R. Juhasz
Assistant Examiner—Z. R. Bilinsky
Attorney, Agent, or Firm—Reising, Ethington & Perry

[57] ABSTRACT

A rotary spindle and draw bar assembly of the type including a hollow spindle having a tool holder seat defined at one end thereof, and a draw bar mounted in the spindle for axial movement with respect to the spindle between an active, tool holder retaining position for retaining a tool holder in non-rotatable engagement with the spindle, and an inactive, tool holder releasing position permitting the tool holder to be removed from the tool holder seat. Spring means biases the draw bar to its active position such that movement of the draw bar from its active position requires deflection of the spring means. In accordance with the invention, a lock-out means is provided which is operable to positively lock the draw bar in its active position and prevent deflection of the spring means in response to forces acting on the tool holder end of the draw bar so that forces on the draw bar during machining operations cannot cause accidental release of the tool holder, and the tool carried thereby, from the spindle. Actuation of an hydraulic cylinder or the like to move the draw bar from its active position to its inactive position sequentially actuates (1) the lock-out mechanism to an unlocked position and (2) the draw bar to its inactive, tool holder releasing position. When a tool holder is installed in the spindle with the draw bar held in its inactive position by the hydraulic cylinder, release of the draw bar by the hydraulic cylinder causes the draw bar to be biased to its active position, and the lock-out mechanism automatically assumes its locked position to lock out the springs and prevent accidental movement of the draw bar from its active to inactive position. The invention is particularly suitable for use with apparatus of the type disclosed in U.S. application Ser. No. 376,634, filed July 5, 1973 of Dale J. Bondie, the entire disclosure of which is incorporated herein by reference.

9 Claims, 2 Drawing Figures

SPINDLE AND DRAW BAR ASSEMBLY

This invention relates generally to machine tool assemblies and components such as rotary spindles for use with machine tools in the performance of various types of operations such as milling, drilling, boring, tapping and the like, and is particularly concerned with tool holding assemblies of the spindle and draw bar type wherein a draw bar is mounted in a hollow spindle for axial movement with respect to the spindle between an active, tool retaining position for retaining a tool holder or the like in non-rotatable engagement with the spindle, and an inactive, tool releasing position permitting a tool holder or the like to be removed from the spindle.

Tools for performing various types of operations such as milling, drilling, boring, tapping and the like, are conventionally releasably mounted on the rotary spindle of a machine tool. Each tool is generally secured to a tool holder or adapter which in turn is releasably mounted in a tool holder seat on the rotary spindle. The tool holder is generally held in non-rotatable engagement with the tool holder seat by a draw bar mounted in the spindle for axial movement between an active position in which it secures the tool holder in non-rotatable engagement with the tool holder seat so that the tool holder rotates with the spindle, and an inactive, tool holder releasing position in which a tool holder can be removed from, or installed on, the spindle. The draw bar is generally biased by springs to its active position, and the force exerted by the biasing means secures the tool holder seat in tight, frictional engagement with tool holder seat. The draw bar is actuated from its active, tool holding position to its inactive, tool holder releasing position against the bias of the springs by a draw bar actuator in the form of a hydraulic motor or the like when it is desired to remove the tool holder from the spindle. Examples of machines of this general type are disclosed in U.S. Pat. Nos. 3,516,149 and 3,520,228.

During certain types of operations with machines of the type described in the preceding paragraph, significant forces are applied to the draw bar through the tool holder in a direction to deflect the spring and hence the draw bar toward its inactive, tool holder releasing position. If the forces are sufficient to overcome the draw bar spring forces, the tool holder may be accidentally ejected from the spindle during the machining operation. The susceptibility of the tool holder to being accidentally ejected from the spindle is particularly high during an undercutting operation wherein the tool mounted in the tool holder secured to the spindle by the draw bar engages a workpiece in a manner such as to produce forces tending to pull the tool and tool holder out of the spindle.

During production operations, it is of course desirable for the operator to be able to quickly remove and install tool holders from and onto the spindles of the machines. Accordingly, any mechanism provided for locking the draw bar in its active, tool holding position, must be capable of being quickly and automatically released so as not to interfere with ejection of the tool holder from the spindle when desired.

An object of this invention is to provide a draw bar actuated tool holder assembly of the type in which a movable draw bar has an active, tool holding position and an inactive tool releasing position wherein a lock-out mechanism automatically engages when the draw bar is in its active, tool holding position to positively lock the draw bar against movement toward its inactive, tool releasing position in response to forces applied to the draw bar by the tool, but which can be quickly released when desired to actuate the draw bar to its inactive position.

A further object is to provide a draw bar actuated tool holder assembly wherein a tool, or tool holder, is retained in a spindle by a draw bar having an active, tool retaining position and an inactive, tool releasing position, the draw bar being biased to its active position and actuable to its inactive position by draw bar actuating means, wherein the draw bar is automatically locked against movement from its active position and can only be actuated from its active position by the draw bar actuating means to prevent accidental ejection of the tool or tool holder from the spindle.

The foregoing and other objects, are achieved in accordance with the present invention by an assembly including a rotary spindle with a draw bar mounted in the spindle for axial movement between an active, tool holding position for holding a tool or tool holder in a tool holder seat defined at one end of the spindle, and an inactive tool holder releasing position permitting the tool or tool holder to be removed from the tool holder seat. The draw bar is urged by spring means or the like to its active position, and is selectively actuated by a draw bar actuator, which may be a hydraulic motor or other power means, to its inactive position against the bias of the springs. Lock-out means is provided for automatically locking the draw bar against movement from its active position in response to forces applied to the draw bar through the tool retained thereby so that the draw bar actuator only can actuate the draw bar to its inactive, tool releasing position.

Briefly, the lock-out means includes an abutment or shoulder formed by a wall of a groove on one of the draw bar and spindle, at least one locking element on the other of the draw bar and spindle, the locking element being movable between an extended position engaging the abutment in the active position of the draw bar to prevent movement of the draw bar from its active position, and a retracted position releasing the draw bar and permitting the draw bar to move to its inactive position, and a lock actuator operable to actuate the locking element between its extended and retracted positions. The locking plunger is biased to its locking position so that when the draw bar assumes its active position, the locking elements are automatically urged into engagement with the abutment to lock the draw bar into its active position. Actuation of the draw bar actuator sequentially moves the locking plunger in a direction to actuate the locking elements to their unlocked position then to move the draw bar toward its inactive position.

Figure 2:
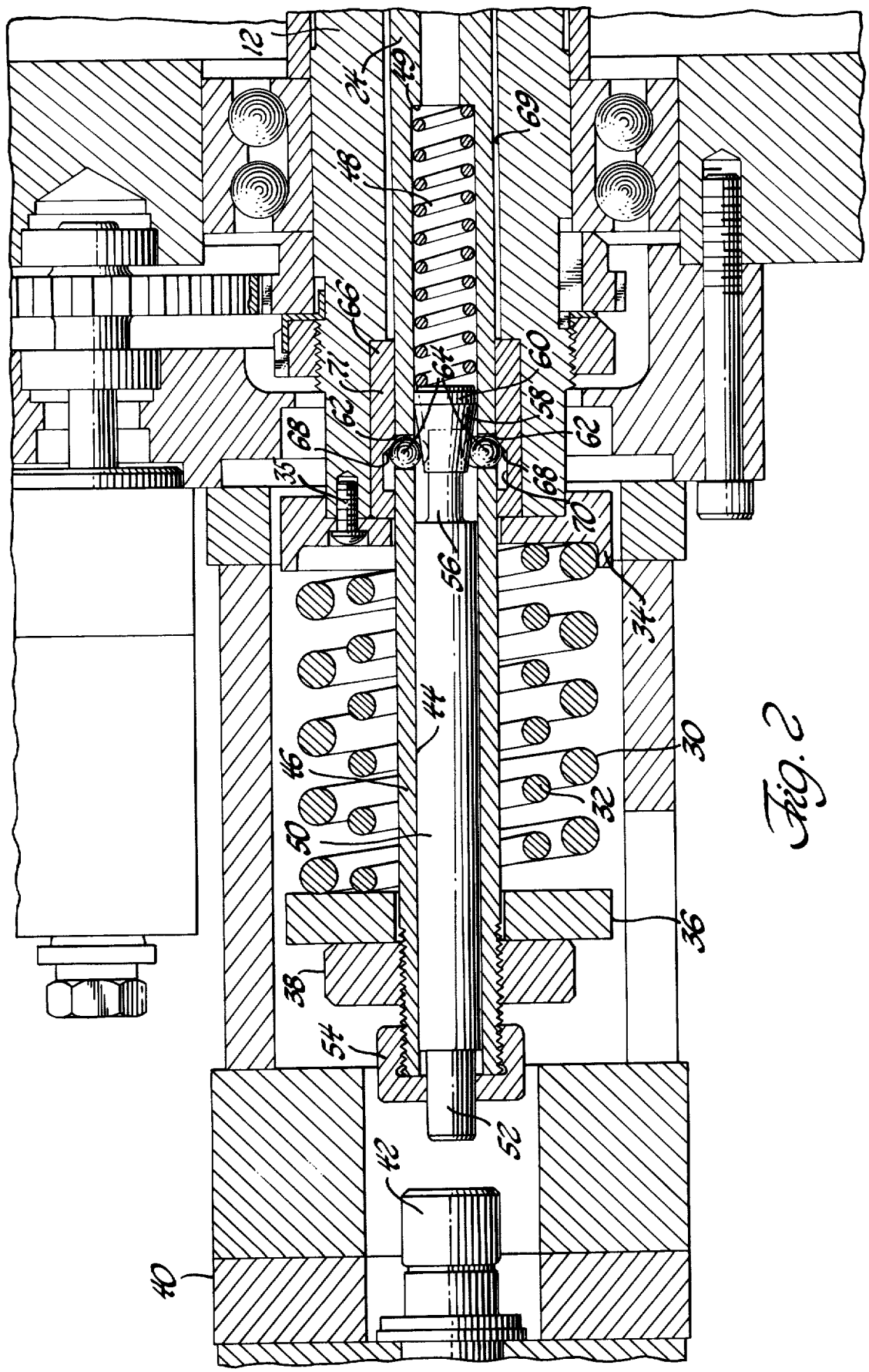

Other objects, advantages and features of the invention will become apparent from the following description taken into connection with the accompanying drawings in which:

FIG. 1 is a longitudinal view, partially in section, of a machine having a spindle and draw bar assembly with a locking mechanism embodying the present invention; and FIG. 2 is a fragmentary, enlarged sectional view of the lock-out mechanism employed in the machining of FIG. 1.

With reference to FIG. 1, reference numeral 10 collectively designates the portion of a machine tool in which is rotatably mounted a hollow spindle 12. An enlarged cavity 14 is formed at the outer, or right hand end of the spindle 12 as viewed in FIG. 1. Mounted in the cavity 14 in non-rotatable engagement with the spindle 12 is a tool holder seat member 16 having a tapered socket or seat 18 for a tool or tool holder. Received in the socket 18 is the shank or body portion 22 of a tool holder 20. The shank 22 of the tool holder is held in tight, frictional engagement with the socket 18 so that the tool holder rotates with the spindle 12. The shank 22 is held in tight, frictional engagement with the socket 18 by a draw bar 24, the draw bar 24 being slidably mounted in the spindle 12 for axial movement with respect to the spindle 12.

The draw bar 24 is connected with the tool holder 20 by an expansible and contractable collet 26 which cooperates with a cam member 28 in such a manner that movement of the draw bar to the active position illustrated in FIG. 1 causes the collet 26 to grip the tool holder 20 and pull it into tight, frictional engagement with the socket 18, while movement of the draw bar 24 toward the right with respect to the spindle 12 as viewed in FIG. 1 causes the collet 26 to expand and release the tool holder 20. The position of the draw bar 24 shown in FIG. 1 is referred to herein as the "active" or tool retaining position, while movement of the draw bar 24 to the right with respect to the spindle 12 in FIG. 1 is referred to as the "inactive" tool releasing position of the draw bar. The collet 26 carried by the draw bar and the cam member 28 carried by the spindle comprises tool holder gripping means operable to grip the tool holder 20 and secure the tool holder in frictional engagement with the socket 18 in the active position of the draw bar 24 and a tool holder releasing position operable to expand the collet and release the tool holder and permit it to be ejected from the socket 18 in the inactive position of the draw bar. The specific construction of the tool holder gripping means 26, 28 form no part of the present invention.

The draw bar 24 is biased toward its active, tool retaining position by draw bar springs 30 and 32 which are seated between spring seat members 34 and 36. The spring seat member 34 is secured by conventional fasteners 35 to the left, or rear end of the spindle 12. The spring seat member 36 is restrained against movement in one direction relative to the draw bar 24 by a stop nut 38 threaded onto the end of the draw bar 24. Actuation of the draw bar 24 toward the right in FIG. 1 to its inactive, tool releasing position is provided by draw bar actuating means in the form of a conventional hydraulic motor 40 having a piston defining a draw bar actuator 42. When the hydraulic motor 40 is energized, the piston, or draw bar actuator 42, moves to the right to engage the draw bar 24 and urge it toward the right to its inactive position against the bias of the springs 30 and 32, the springs 30 and 32 being compressed by the force of the hydraulic motor 40.

When the draw bar actuator 42 returns to the position shown in FIG. 2, the draw bar springs 30 and 32 return the draw bar to the active position shown in FIGS. 1 and 2 to pull the tool holder 20 into tight, frictional engagement with the seat 18 so that the tool holder 20, and any tool carried thereby, will rotate with the spindle 12.

In certain machining operations, particularly where an undercutting operation is being performed, a force is produced in an axial direction toward the right as viewed in FIG. 1 against the force of springs 30 and 32. Under some circumstances, the force exerted by the tool during an undercutting operation can be sufficient to overcome the force of the springs 30 and 32. If the springs 30 and 32 provide the sole force for maintaining the draw bar in its active position, the forces exerted during operations such as an undercutting operation, can overcome the force of the springs 30 and 32 to cause the draw bar 24 to move to the right from the active position shown in FIG. 2 and cause accidental ejection of the tool holder 20 from the seat 18. The present invention provides lock-out means operable automatically upon movement of the draw bar to its active position to lock the draw bar against movement from its active position in response to any forces applied to the draw bar.

With reference to FIG. 2, the lock-out means includes a hollow, tubular end portion 46 on the end of the draw bar 24 opposite the tool engaging end thereof. The tubular end portion 46, in the illustrated embodiment, comprises a continuation of the draw bar 24. However, it is obvious that the end portion 46 could also be attached separately to the draw bar to form a continuation thereof.

The tubular end portion 46 includes an elongated, cylindrical opening 44, and lockout biasing means in the form of a helical spring 48 is received in the opening 44 with one end seated against a shoulder 49 and its other end seated against a lock actuator including a cylindrical plunger 50 slidably mounted in the cylindrical opening 44 of the tubular extension 46. Projecting from the left end of the locking plunger 50, as viewed in FIG. 2, an operating stem 52 of reduced diameter with respect to the plunger 50. The stem 52 slidably projects through an opening in an end cap 54 threadedly mounted onto the end of the tubular extension or end portion 46 of the draw bar 24. Spring 48 biases the locking plunger 50 toward the left as viewed in FIG. 2 so that the operating stem 52 projects beyond the end of the end cap 54. As is apparent from FIG. 2, the draw bar actuator 42 will move toward the right to sequentially (1) engage the stem 52 and compress spring 48 until the end of the stem 52 becomes flush with the end cap 54 and then (2) engages the end cap 54 and compress the draw bar springs 30 and 32 to actuate the draw bar 24 toward its inactive position.

Projecting from the right end of the lock actuator plunger 50, as viewed in FIG. 2, is a reduced neck portion 56, and a frusto-conical wedging member 58 projects from the end of the neck member 56 opposite the locking plunger 50. The wedging member 58 is formed at its large diameter end with a cylindrical extension 60 of the same diameter as the plunger 50 for slidable engagement with the surface of the cylindrical opening 44.

A plurality of angularly spaced apertures 62 are formed in the side wall of the tubular extension 46, two diametrically opposed apertures 62 being visible in FIG. 2, however, it is apparent that additional apertures, angularly spaced around the side of the tubular extension 46 can be provided. The apertures 62, as shown, have the same axial location on the tubular extension 46. Received in each of the apertures 62 is a locking element in the form of a ball 64. As shown in FIG. 2, each of the locking balls 64 is seated on the surface of the frusto-conical wedging member 58. In the locked position shown in FIG. 2, each of the balls 64 projects outwardly from its respective aperture 62 so as to project beyond the outer side wall of the tubular extension 46.

The draw bar 24 is received in an axial opening 69 extending through the spindle 12, the spindle 12 defining the draw bar support means. The opening 69 has an enlarged diameter portion 71 formed at the left end of the spindle, and a locking sleeve member 66 is received in the large diameter portion 71 and is retained in position by the spring plate 34. The locking sleeve 66 is formed with a groove 70 having an inclined side wall 68 forming a locking shoulder engageable by the balls 64 in their extended, locking position shown in FIG. 2. In the position shown in FIG. 2, the balls 64 are wedged between the inclined surface of the side wall 68, the wall of the respective apertures 62, and the surface of the frusto-conical wedging member 58 to prevent axial movement of the draw bar 24 toward the right. In the position shown in FIG. 2, thus, the springs 30 and 32 are locked out by the locking elements 64 so that axial force toward the right (as viewed in FIG. 2) on the draw bar 24 cannot compress the springs 30, 32; such axial force being positively non-resiliently resisted by the engagement of the locking balls 64 with the surfaces 68. Consequently, any axial force on the tool carried by the tool holder 20 tending to move the draw bar 24 toward its inactive, tool releasing position, is positively resisted by the lock-out mechanism, instead of simply by the resilient resistance of the springs 30 and 32.

When it is desired to remove the tool holder 20 from the seat 16, the hydraulic motor 40 is actuated to cause the draw bar actuator 42 to engage the operating stem 52 and shift the locking plunger 50 toward the right to compress spring 48 and shift the wedging member 58 to a position permitting the locking balls 64 to retract radially inwardly to the broken line position illustrated in FIG. 2 in which the locking balls 64 are out of engagement with the locking shoulders 68 of the locking sleeve 66. Consequently, when the draw bar actuator 42 engages the end cap 54, the draw bar 24 is free to move to the right carrying the retracted balls 64 past the ramp 68 and permitting the draw bar 24 to assume its inactive, tool releasing position. Thus, as the motor 40 is energized, the draw bar actuator 42 moves toward the right to sequentially (1) depress the operating stem 52 to unlock the lock-out mechanism and (2) engage the end cap 54 to actuate the draw bar 24 to the right and compress the springs 30 and 32. Movement of the draw bar 24 toward the right causes the tool holder gripping means 26, 28 to assume the tool holder releasing position, after which the draw bar engages the end of the tool holder 20 and ejects the tool holder from frictional engagement with the socket 18.

In summary, FIGS. 1 and 2 illustrate a tool holding assembly comprising a draw bar support means 12, means defining a tool holder seat 18; a draw bar 24 mounted on the draw bar support means 12 for movement relative to the tool holder seat 18 between an active, tool retaining position for retaining the tool holder in the seat 18, and an inactive, tool releasing position for permitting the tool to be removed from or installed in the tool holder seat 8; and lock-out means 46 operable automatically upon movement of the draw bar to its active position to lock the draw bar against movement from its active position of FIGS. 1 and 2 in response to forces applied to the draw bar. The draw bar can be moved from its active position only by actuation of the operating stem 52 upon selective actuation of the draw bar actuator 42 to release the locking balls 64 to permit the draw bar 24 to slide relative to the spindle 12.

The lock-out means comprises abutment means 68 on one of the draw bar and spindle, at least one locking element 24 on the other of the draw bar and spindle movable between a locked position shown in FIG. 2 in full lines in which it engages the abutment means 68 in the active position of the draw bar, and an unlocked position as shown in broken lines in FIG. 2 to release the draw bar to move to its inactive position, and means 58 for actuating the locking elements 64 between their locked and unlocked positions.

While a specific form of the invention is illustrated in the accompanying drawings and described in the foregoing specification, it should be understood that the invention is not limited to the exact construction shown. To the contrary, alterations and modifications in the construction and arrangement of parts, all falling within the scope and spirit of the invention, will be apparent to those skilled in the art.

The embodiments of the invention in which an exclusive property or priviledge is claimed are defined as follows:

1. A tool holding assembly comprising: a hollow spindle; a draw bar mounted in said spindle for axial movement with respect thereto between an active position for retaining a tool holder or the like in said spindle, and an inactive position permitting a tool holder or the like to be removed from or installed on the spindle; draw bar biasing means biasing said draw bar to said active position; lock-out means on said draw bar and spindle operable automatically upon movement of said draw bar to its active position to lock said draw bar against movement from its active position in response to forces applied to said draw bar so that release of said lock-out means is required in order to subsequently move the draw bar to its inactive position; said lock-out means including means defining a tubular extension on said draw bar; at least one aperture in the wall of said tubular extension; means defining a locking shoulder on said spindle; a locking element carried by said tubular member movable between an extended position projecting through said aperture beyond the periphery of said tubular member to engage said locking shoulder and a retracted position retracted radially from said extended position in which it does not project beyond the periphery of said tubular extension; and a lock actuator slidably received in said tubular extension for movement between a locking position in which it actuates said locking element to its extended position and a released position in which said locking element is movable to its retracted position, whereby said draw bar can be moved to said inactive position from said active position against said draw bar biasing means only subsequent to movement of said lock actuator to said released position.

2. An assembly as claimed in claim 1 wherein a locking sleeve is carried by said spindle and having a recess formed in its inner wall; said sleeve slidably receiving said tubular extension such that said aperture communicates with said recess in the active position of said draw bar; said recess having a wall defining said locking shoulder.

3. An assembly as claimed in claim 2 wherein said lock actuator includes a wedging element engaging said locking element in the locking position of said lock actuator to extend said locking element into said recess to engage said shoulder when said draw bar is in its active position.

4. An assembly as claimed in claim 3 wherein said locking element comprises a ball held captive in said aperture by said wedging member, said wedging member having a tapered surface slidably engageable with said ball to cause said ball to extend and retract.

5. An assembly as claimed in claim 4 wherein said locking shoulder is inclined radially and axially inwardly in the direction of the active position of said draw bar, and said wedging member comprises a frusto-conical member tapered in the opposite direction to the inclination of said shoulder.

6. An assembly as claimed in claim 5 wherein said lock actuator further includes a lock-out biasing spring received in said tube and engaging the large end of said frusto-conical wedging element to bias said lock actuator toward its locking position.

7. An assembly as claimed in claim 6 wherein said lock actuator further includes an operating stem on the end thereof opposite said wedging member, said operating stem being biased by said lock-out biasing means to project from the end of said tubular member.

8. An assembly as claimed in claim 7 further including draw bar actuating means selectively operable when the draw bar is in its active position to sequentially (1) engage said operating stem and actuate said lock actuator to its released position against the bias of said lock-out biasing means to permit said ball to retract out of engagement with said locking shoulder, and (2) engage said end of said tubular member from which said operating stem projects and actuate said draw bar to its inactive position against said draw bar biasing means; said draw bar actuating means being selectively movable in the opposite direction when said draw bar is in its inactive position to sequentially (1) permit said draw bar biasing means to return said draw bar to its active position and (2) permit said lock-out spring to return said lock actuator to its locking position when the draw bar reaches its active position.

9. In a tool holding assembly for a machine tool wherein a tool holder or the like is releasably secured to a rotary, hollow spindle by a draw bar having a tool engaging end and mounted in the spindle for axial movement with respect to the spindle between an active position for holding the tool holder in the spindle and an inactive position for releasing the tool holder, the draw bar being resiliently urged by biasing means to its active position so that movement of the draw bar to its inactive position is against a biasing force, characterized by lock-out means interconnected between the spindle and draw bar for positively locking the draw bar in its active position so that the lock-out means must be deactivated before the draw bar can be actuated to its inactive position against the biasing force; said lock-out means comprising: a tubular portion on the end of said draw bar opposite the tool engaging end thereof; a lock actuator slidably mounted in said tubular portion for movement between a locking position and a released position; lock-out biasing means in said tubular portion biasing said lock actuator to its locking position; a plurality of angularly spaced apertures in the wall of said tubular member having the same axial location along said tubular member; means defining a locking groove on said spindle, said apertures communicating with said locking groove in the active position of said draw bar; a ball received in each of said apertures; and said lock actuator including a wedging member slidably engaging said balls and actuating said balls to project into said recess in the locking position of said lock actuator and the active position of said draw bar, and permitting said balls to retract from said locking groove in the released position of said lock actuator.

* * * * *